United States Patent
Oh et al.

(10) Patent No.: US 6,668,225 B2
(45) Date of Patent: Dec. 23, 2003

(54) TRAILER CONTROL SYSTEM

(75) Inventors: Pahngroc Oh, Ann Arbor, MI (US);
Scott Funke, Farmington, MI (US);
Kevin J. Pavlov, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 8 days.

(21) Appl. No.: 09/990,482

(22) Filed: Nov. 16, 2001

(65) Prior Publication Data

US 2002/0095251 A1 Jul. 18, 2002

Related U.S. Application Data

(60) Provisional application No. 60/253,894, filed on Nov. 29, 2000.

(51) Int. Cl.$^7$ .............................. B60T 13/00; B60T 8/02
(52) U.S. Cl. .............................. 701/70; 701/48; 701/78; 701/83; 340/431; 303/123; 303/124; 280/428; 280/432; 180/282
(58) Field of Search .............................. 701/78, 70, 38, 701/48, 72, 83; 340/431; 303/123, 124; 280/428, 432; 180/282

(56) References Cited

U.S. PATENT DOCUMENTS

| | | | |
|---|---|---|---|
| 3,894,773 A | * 7/1975 | Cleveland et al. | 303/123 |
| 3,993,362 A | * 11/1976 | Kamins et al. | 303/146 |
| 4,060,284 A | * 11/1977 | Steiner | 303/123 |
| 5,001,639 A | 3/1991 | Breen | |
| 5,022,714 A | 6/1991 | Breen | |
| 5,033,798 A | 7/1991 | Breen | |
| 5,042,883 A | 8/1991 | McCann et al. | |
| 5,380,072 A | * 1/1995 | Breen | 303/7 |
| 5,403,073 A | * 4/1995 | Frank et al. | 303/7 |
| 5,411,322 A | * 5/1995 | Breen | 303/7 |
| 5,620,236 A | * 4/1997 | McGrath et al. | 303/7 |
| 5,690,347 A | * 11/1997 | Juergens et al. | 280/432 |
| 5,747,683 A | * 5/1998 | Gerum et al. | 73/118.1 |
| 5,912,616 A | 6/1999 | Valentino | |
| 6,042,196 A | 3/2000 | Nakamura et al. | |
| 6,079,791 A | 6/2000 | Stumpe et al. | |
| 6,139,118 A | 10/2000 | Hurst et al. | |
| 6,225,894 B1 | * 5/2001 | Kyrtsos | 340/440 |
| 6,253,885 B1 | 7/2001 | Tsai et al. | |
| 6,259,985 B1 | 7/2001 | Sielagoski et al. | |
| 6,264,286 B1 | 7/2001 | Ehrlich et al. | |
| 6,273,522 B1 | 8/2001 | Feetenby et al. | |

OTHER PUBLICATIONS

C. Beyer, et al., "Electronic Braking System EBS—Status and Advanced Functions," SAE Technical Paper Series, Paper No. 982781, Nov. 1998.

Chieh Chen, et al., "Steering and Independent Braking Control for Tractor–Semitrailer Vehicles in Automated Highway Systems," Proceedings of the 34$^{th}$ Conference on Decision & Control, IEEE, Dec. 1995, pp. 1561–1566.

(List continued on next page.)

Primary Examiner—William A. Cuchlinski, Jr.
Assistant Examiner—Eric M Gibson
(74) Attorney, Agent, or Firm—Brinks Hofer Gilson & Lione (57) ABSTRACT

A trailer control system incorporates sensors on both the trailer and a tow vehicle towing the trailer to measure operating parameters of both the trailer and the tow vehicle or prime mover. A computer mounted in the trailer or in the tow vehicle gathers input data from the sensors, including a variety of measurements of force, displacement, and temperature for the tow vehicle, the trailer, and their components. The computer may also be used to apply braking forces to the wheels of the trailer. Using the simulator, a variety of components on the trailer may be tested, their performance measured, and a better trailer may be designed. A trailer may also incorporate such a system for better control of the trailer and the combination vehicle of which it is a part.

18 Claims, 12 Drawing Sheets

OTHER PUBLICATIONS

Chieh Chen, et al., "Dynamic Modeling of Articulated Vehicles for Automated Highway Systems," Proceedings of the American Control Conference, Jun. 1995, pp. 653–657.

Daniel D. Eisele, et al., "Vehicle Dynamics Control with Rollover Prevention for Articulated Heavy Trucks," Proceedings of AVEC 2000, Aug. 2000, pp. 123–130.

Dongyoon Hyun, et al., "Vehicle Modeling and Prediction of Rollover Stability Threshold for Tractor–Semitrailers," Proceedings of AVEC 2000, Aug. 2000, pp. 753–760.

Richard H. Klein, et al., "Lateral/Directional Stability of Tow Dolly Type Combination Vehicles," SAE Paper No. 960184 (1996), pp. 99–110.

Pahngroc Oh, et al., "Stability Control of Combination Vehicle," SAE Paper No. 2001-01-0138 (2001).

Anton T. van Zanten, et al., "VDC, The Vehicle Dynamics Control System of Bosch," SAE Technical Paper Series No. 950759 (1995).

Jeng–Yu Wang, et al., "Analysis and Controller Design Based on Linear Model for Heavy–Duty Vehicles," Proceedings of the ASME, vol. 64 (1998), pp. 729–735.

Jeng–Yu Wang, et al., "Robust H∞ Lateral Control of Heavy–Duty Vehicles in Automated Highway System," Proceedings of the American Control Conference, Jun. 1999, pp. 3671–3675.

* cited by examiner

TRAILER CONTROL SYSTEM

This application claims priority to and the benefit of Provisional Application 60/253,894, filed Nov. 29, 2000, entitled, "Trailer Simulator System and Operating Method," which is hereby incorporated by reference.

FIELD OF THE INVENTION

The present invention relates to automotive vehicles, and in particular to a control system for towed automotive vehicles, such as trailers and semi-trailers, and a method of operating control systems for vehicles with trailers.

BACKGROUND OF THE INVENTION

Trailers play an important role in the transportation of goods. In addition to the great variety of trailers used in Class 7 and 8 heavy truck transports, there are many trailers of a smaller nature, such as those towing boats, household goods, harvested crops, automobiles, and so on. The proper control of trailers is necessary for their safe and economical operation, both on and off the highway. This is especially important with the higher speeds now allowed on interstate and non-interstate highways. What is needed is a trailer control system that will allow vehicle operators to automatically remain in control of their vehicle prime mover and trailer during difficult driving situations. These situations may include those in which the driver may understeer or oversteer the trailer, or situations in which the trailer may experiences a yaw rate greater than the driver can control, or a roll-over force greater than the driver can control.

BRIEF SUMMARY

In one embodiment of the present invention, a control system is provided for a combination vehicle having a trailer, said control system comprising a computer, a memory accessible to the computer, sensory inputs to the computer and output signals from the computer. There are also at least two brake controllers for wheels on the trailer, said controllers in communication with the computer, wherein the computer receives sensory inputs and calculates brake controller movements to control the movement of the trailer.

The invention may be further embodied in a method of controlling braking of a combination vehicle. The method comprises measuring a plurality of parameters relating to movements and speed of a prime mover and a trailer of the combination vehicle. The method then calculates at least one steering error selected from the group of a braking error, a yaw steering error, and a trailer roll. The method then calculates making a correction to the speed of at least one wheel on the trailer to correct the steering error. Then the method applies the correction by applying a braking force to the at least one wheel. Many other embodiments of the invention are possible.

DETAILED DESCRIPTION OF THE PRESENTLY PREFERRED EMBODIMENTS

Figure 1:
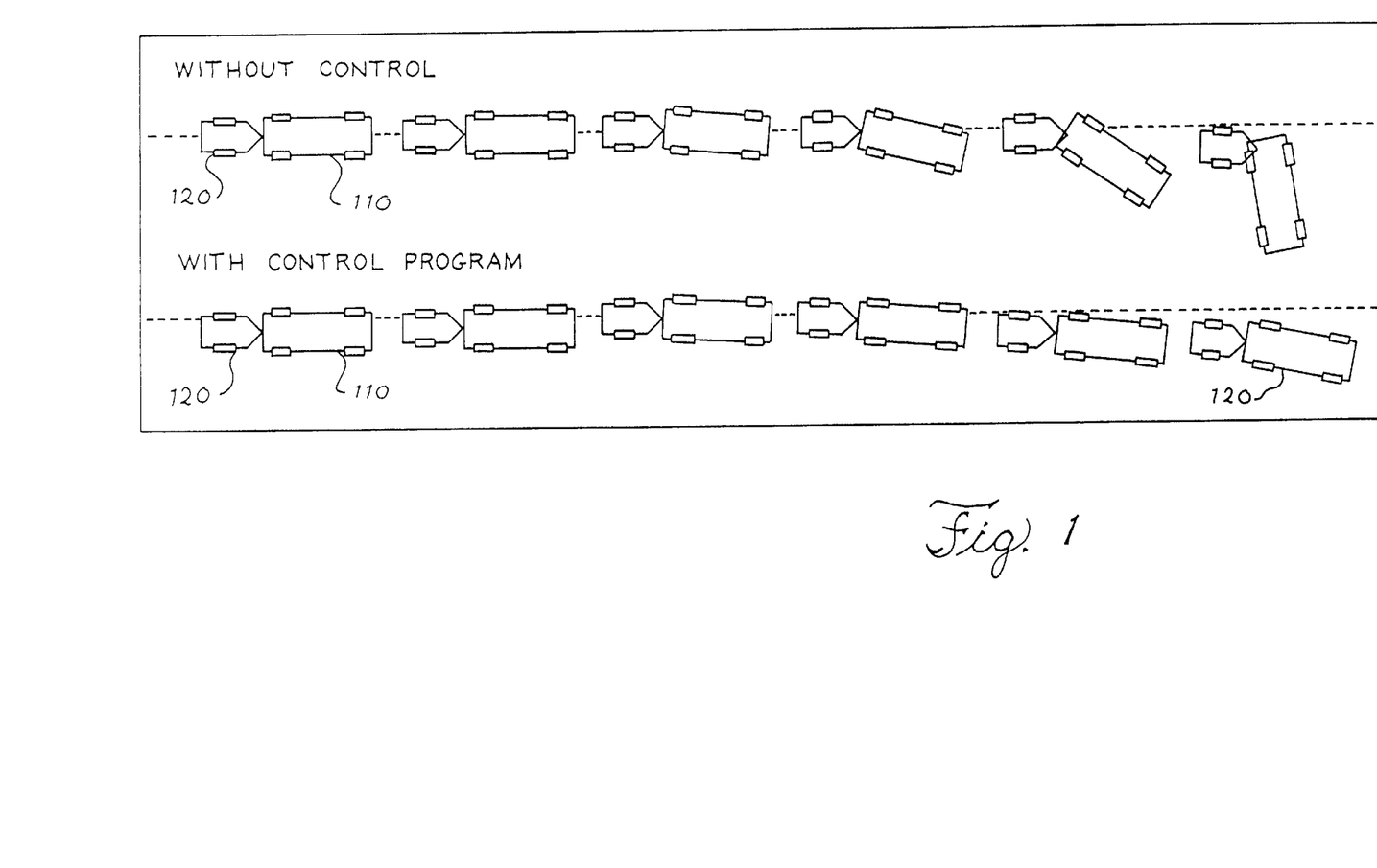
FIG. 1 depicts braking with and without a combination vehicle stability program.

FIG. 1 depicts possible situations in operation of a combination vehicle having a prime mover 110 and a trailer 120. In the upper sequence, the tow vehicle and its trailer may experience a jack-knife response to a 0.5 g deceleration (hard braking) applied by the driver of the tow vehicle. The upper sequence depicts a vehicle without a combination vehicle stabilization or control program. The lower sequence, by contrast, shows a much more controlled response and much less jack-knifing when the same deceleration is applied, but a control program is in use to control the motion of the trailer.

Figure 2:
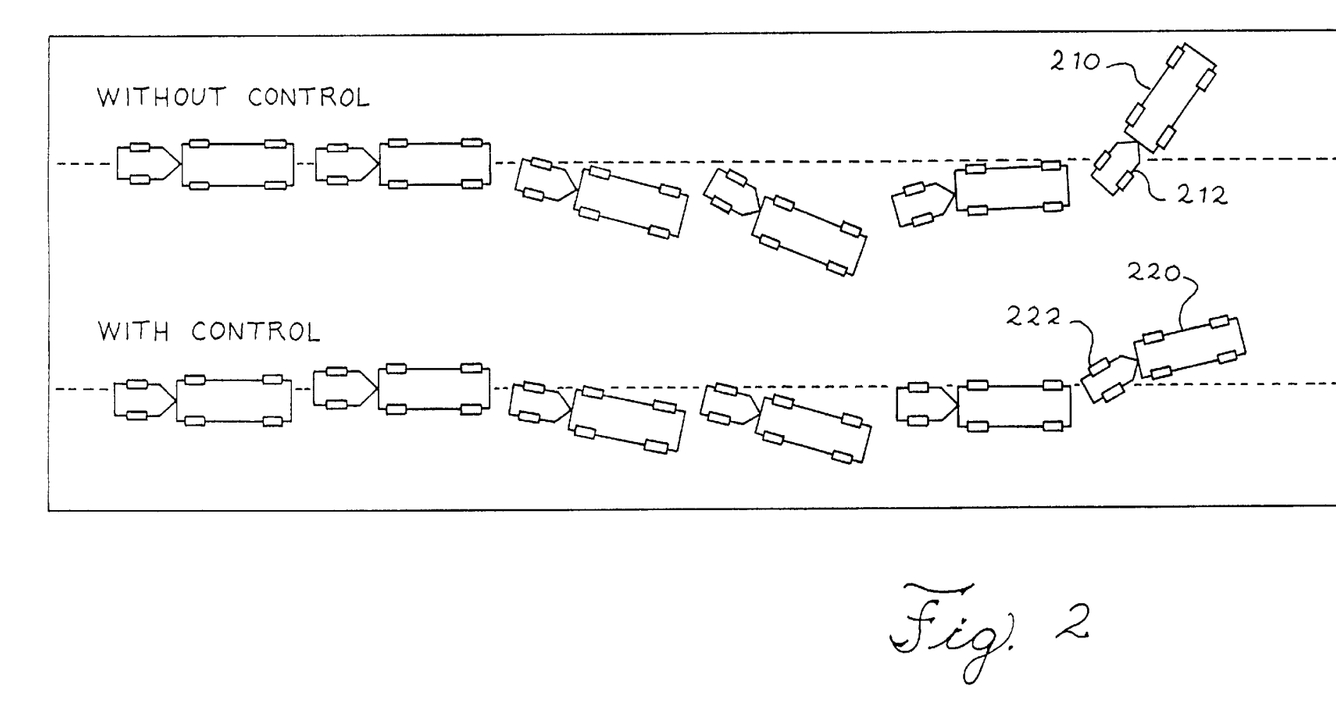
FIG. 2 depicts a lane change for a combination vehicle, with and without a combination vehicle stability program.

FIG. 2 depicts another situation in which combination vehicle stability is in question. The upper sequence depicts a lane change situation for a combination prime mover 210-trailer 212 vehicle attempting a lane change. In this situation, lateral forces on the trailer and the truck have combined to move the combination vehicle in a manner that is presumably not desired by the operator. The lower sequence depicts a combination prime mover 220-trailer 222 having a control program. In the lower sequence, the combination vehicle with the control program is better able to control side forces and guide the combination vehicle in the desired direction.

Figure 3:
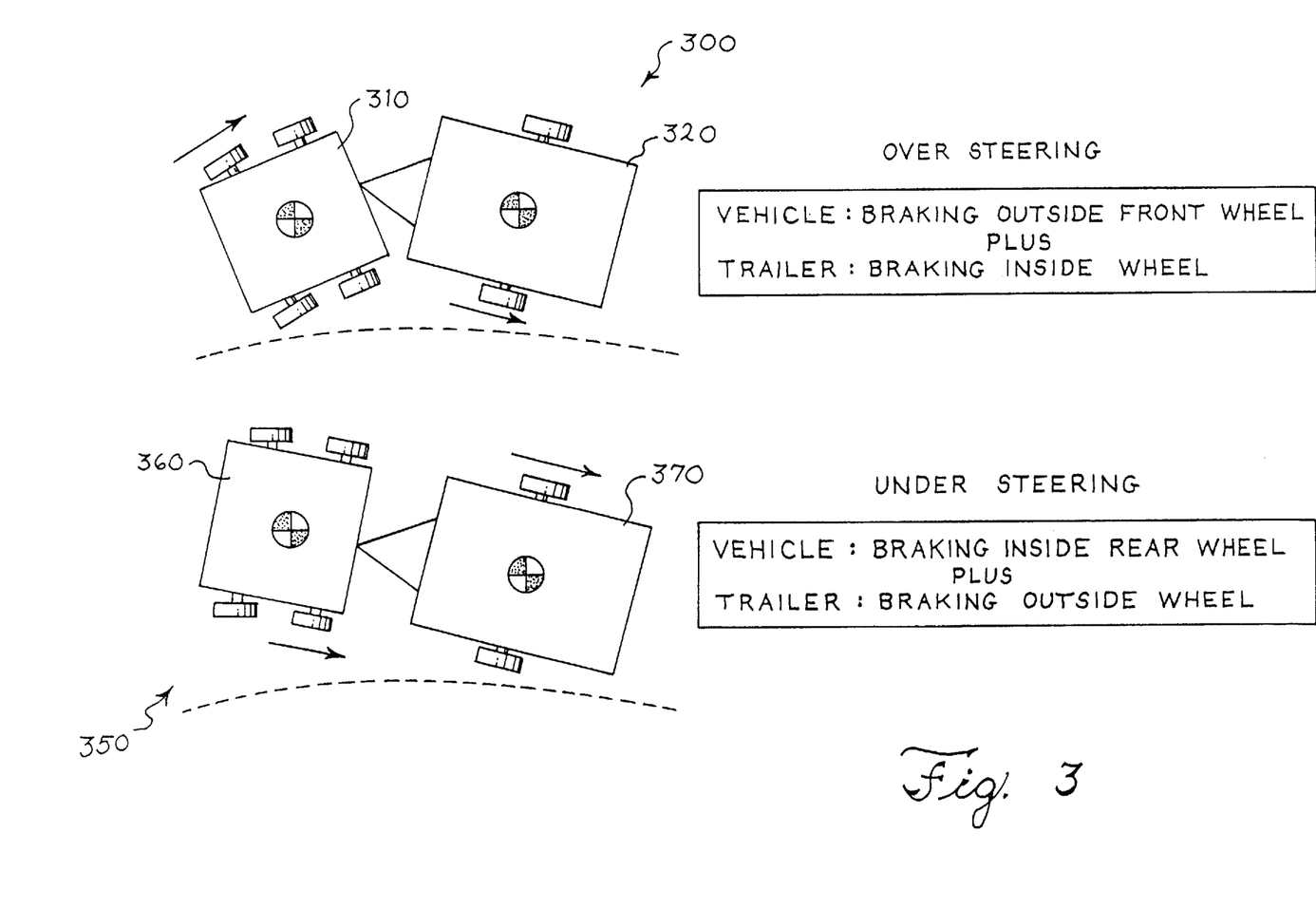
FIG. 3 depicts yaw torque control in a combination vehicle.

FIG. 3 depicts the nature of at least one problem encountered when a combination vehicle changes direction. The vehicle may change direction in an intentional manner, as in making a turn or changing a lane of traffic. The vehicle may also change direction unintentionally, for instance, when the driver decelerates rapidly. In this latter case, a direction change is not desired, but when the direction change occurs it must be controlled or the result may be as depicted in FIG. 1 or 2. The combination vehicle in the upper sequence 300 demonstrates over-steering while making a left turn. In this example, the driver has turned the wheels too far to the left, causing the prime mover 310 to move too far to the left and the trailer 320 to move too far to the right. The combination vehicle, and in particular the trailer, now needs less motion to the left and more to the right. One way to achieve this steering is to selectively apply the brakes to the outside front wheel of the prime mover 310 and to the inside wheel of the trailer 320.

In a similar manner, the lower portion of FIG. 3 depicts under-steering, in which a combination vehicle 350 is turning left, but has not turned sharply enough. In this situation, the correct bearing for the combination vehicle, and especially for the trailer, may be achieved by selectively applying the brakes. The prime mover 360 should apply brakes to the inside rear wheel, causing the prime mover to turn more sharply to the left. At the same time, the trailer 370 must follow the prime mover and should have a small braking force applied to its outside wheel. This will correct the under-steering situation without jackknifing or loss of control. The actions in FIG. 3 depict yaw torque control. Yaw in this context means side-to-side motion in the plane of the road or highway on which the combination vehicle is operating.

Figure 4:
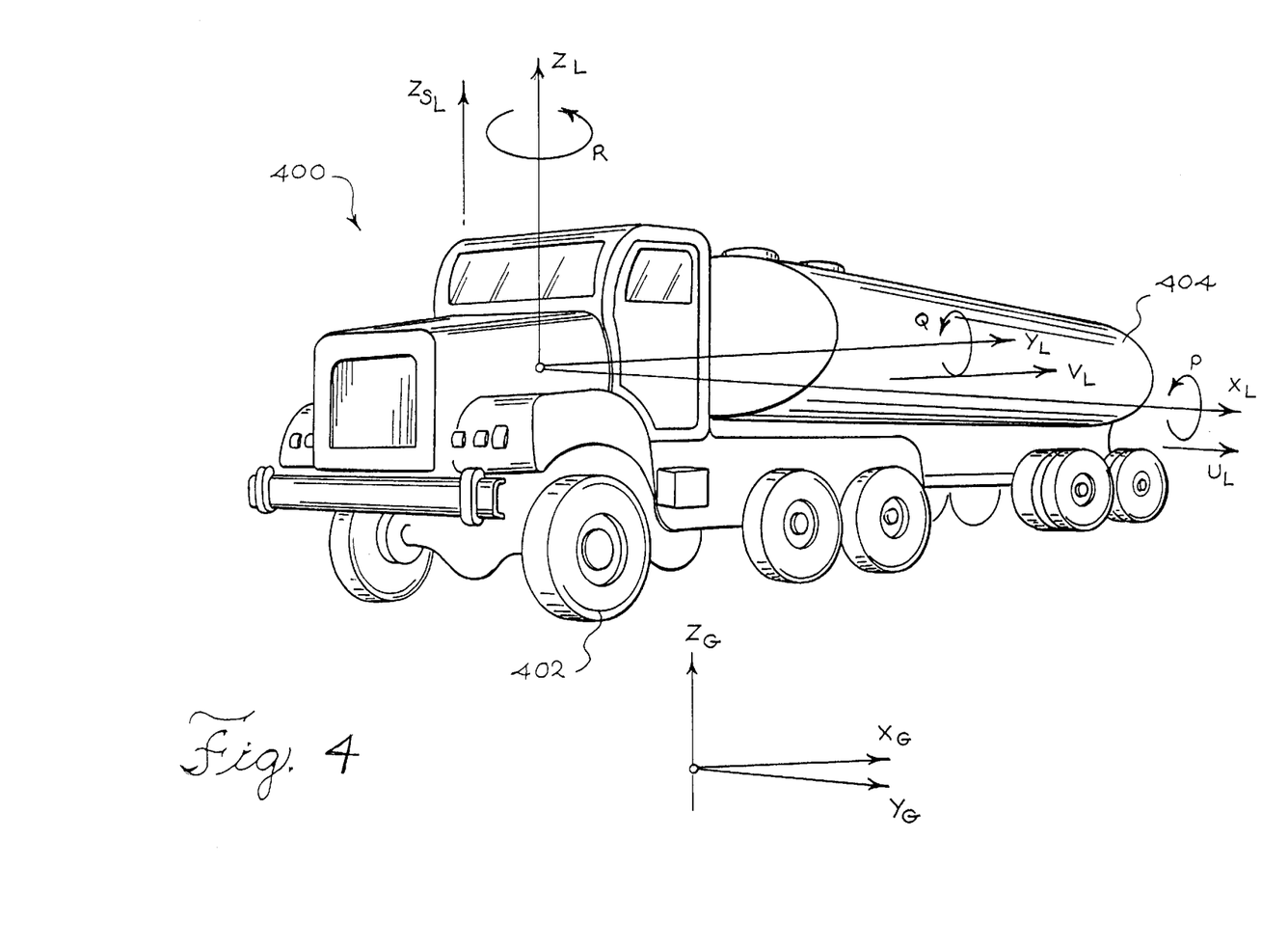
FIG. 4 depicts a coordinate system for a combination vehicle.

FIG. 4 depicts a coordinate system for a combination vehicle 400, comprising a tractor 402 and a trailer 404. The Cartesian coordinates X and Y apply to the direction of travel and the lateral direction, respectively, while the Z axis is the vertical axis. CG depicts the center of gravity of the prime mover. Yaw may be depicted as a rotary motion about the Z-axis, that is, motion "r" in FIG. 4, in the plane of the highway, resulting in side-to-side motion. Roll-over forces may be depicted as a rotary motion about the X axis, depicted as roll-over motion "p" in FIG. 4, or as rotary motion about the Y-axis, depicted as flipping motion "q" in FIG. 4. Roll-over forces for combination vehicles are more likely to turn the vehicle over laterally, that is on the side, rather than flipping the entire vehicle front-to-back or back-to-front, although such a situation may be possible in mountain driving or other unusual operating conditions. For the most part, however, roll-over forces will tend to be those along the X-axis, rotary motion "p," tending to turn the combination vehicle on its side. The trailer simulator should thus be useful in controlling braking forces, yaw forces, and rollover forces. Yaw forces are sometimes called yaw torque forces.

Figure 5:
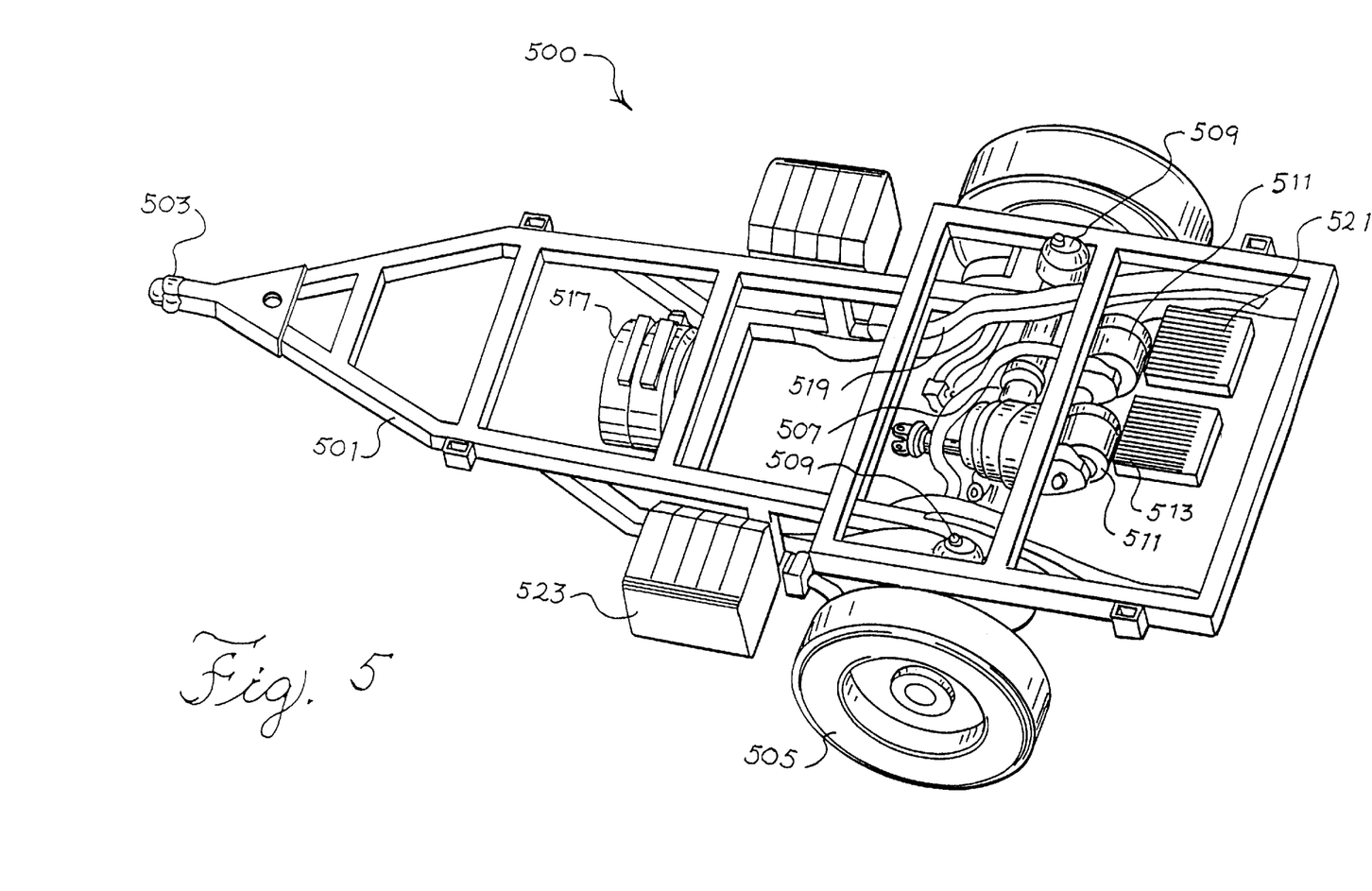
FIG. 5 is an isometric view of an embodiment of a trailer simulator.

FIG. 5 depicts a trailer simulator 500 used for measuring forces and improving performance of a combination vehicle. The trailer simulator includes a chassis 501 having a point of attachment 503 or hitch for joining to a prime mover or tow vehicle (not shown). The trailer simulator has at least two wheels 505, the wheels mounted on an axle 507, which may be common to the two wheels, or may be a separate axle for each wheel. In one embodiment, an electric drum brake 509 is coupled to each wheel. The coupling may be via mechanical components, including a sprocket set 513 and chain 515, or via a planetary gear system (not shown). The coupling enables the motor to apply a "braking force" through mechanical means to either a drum brake or a caliper brake on the wheel. Other brakes may also be present on the trailer simulator, including a variable reluctance brake (not shown). A variable reluctance brake functions largely as an electric brake, but with an added performance advantage in that variable reluctance sensors allow very tight control over the amount of force applied by each brake. The trailer simulator also has a torque biasing unit 517 for distributing torque as desired among the trailer wheels. An eddy current brake 519 provides measured, controllable braking torque rather than conventional friction-material based braking. These components allow for measuring the performance of each brake or actuator used in the trailer simulator. Of course, the performance of more than one actuator at a time may also be measured.

Figure 6:
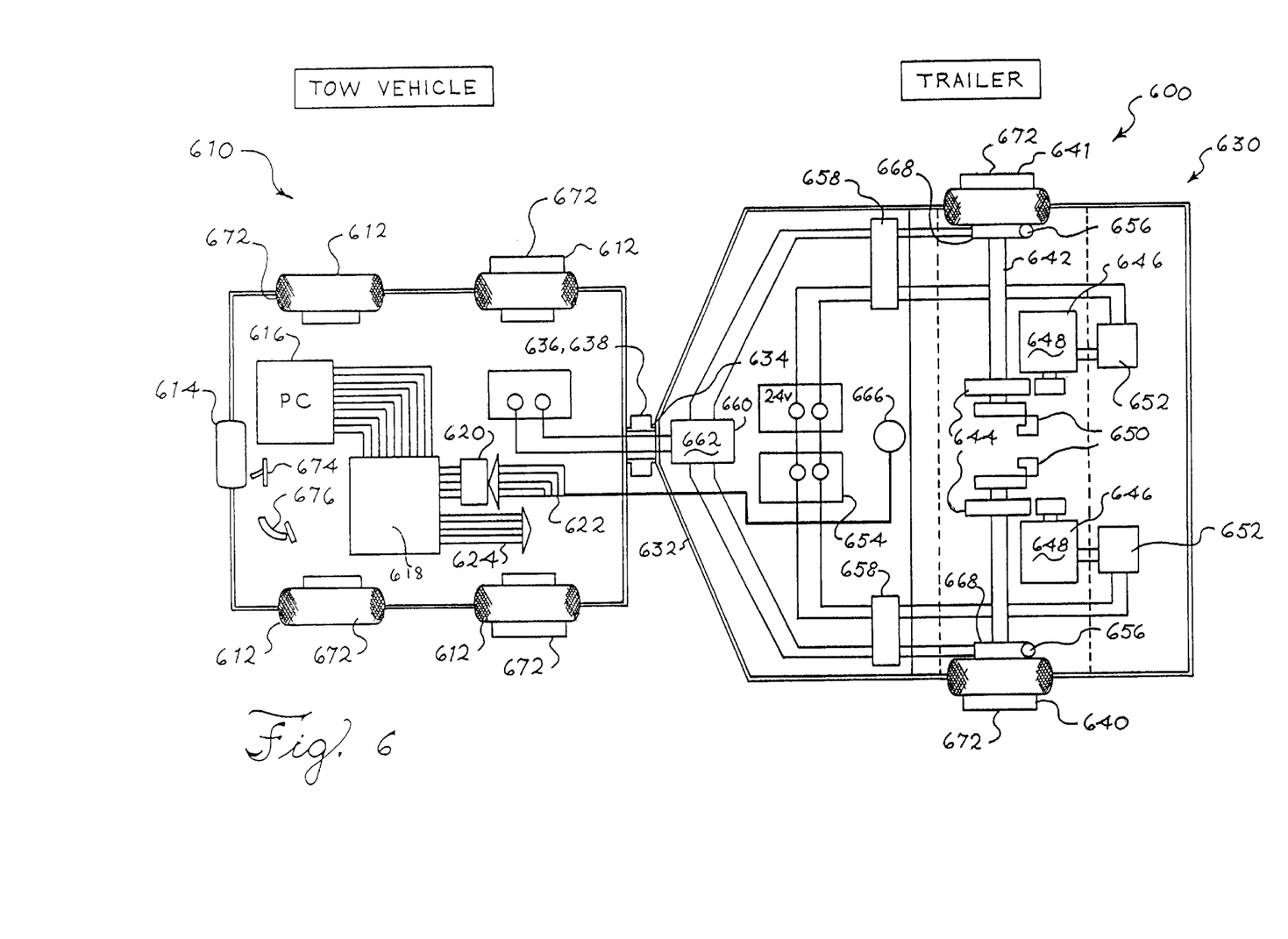
FIG. 6 is a schematic diagram of a tow vehicle and a trailer simulator.

FIG. 6 depicts a schematic representation of another embodiment of a combination vehicle 600. The combination vehicle includes a prime mover or tow vehicle 610. The prime mover may include four or more wheels 612, a vehicle speed sensor 614 and an onboard computer 616, the computer 616 in communication with a microprocessor 618 for controlling braking of the trailer 630 of the combination vehicle 600. The computer may control braking of the prime mover wheels by itself or through an anti-lock brake system (not shown), so as to control separately the braking forces applied to the prime mover left front, left rear, right front and right rear wheels. The controller 618 may be a microprocessor controller, or may be any computer with sufficient processing and memory capabilities to accomplish the task of controlling the braking of the trailer of the combination vehicle. In one embodiment, the trailer or trailer simulator may also include a signal conditioner 620 for receiving sensor inputs 622 from the trailer of the combination vehicle. The signal conditioner may isolate, filter, add an offset, subtract an offset, apply a gain, digitize, or otherwise condition or modify the signals 622 from the sensors. In one embodiment, the conditioned or digitized signals are then sent from the conditioner 620 to the microprocessor 618 for processing into outputs or commands 624 to the trailer brakes. A digital signal processor may also be sufficient for this task. In this embodiment, the microprocessor 618 controls independently the left wheel 640 and the right wheel 641 of the trailer. In other words, there are two trailer wheels and two control channels, one for the left side wheel or left wheels, and for the right side wheel or right wheels of the trailer.

The trailer 630 is part of the combination vehicle 600 The trailer includes a trailer chassis or frame 632, including a point of attachment 634 to the trailer. The point of attachment desirably includes a force sensor 636 and a string potentiometer 638. The force sensor may be a strain gauge or other instrument or sensor capable of measuring and outputting the force between the prime mover 610 and the trailer 630 at the point of attachment 634. A string potentiometer 638 is an instrument that measures and signals the angle between the prime mover and the trailer, the articulation angle. The signals from the force sensor and the string potentiometer are routed to the signal conditioner 620 or to the microprocessor 618 for use in controlling the braking of the trailer.

Trailer 630 also has at least two wheels 640, 641, which may be on a common axle (not shown) or may have independent suspension with individual axles 642. The trailer may also include power transmission components 644 operably connected to the wheels 640, 641. The power transmission components desirably drive motors 646 from a variable reluctance brake 648. The variable reluctance brake functions via the variable reluctance motor, applying more or less resistance to rotation as required. It is useful to have a wheel speed sensor 650, preferably on each wheel of the trailer where control of the braking is desired. Each variable reluctance motor may also have a motor brake driver 652. The driver may be used to control the operation of the variable reluctance brake; the driver may also be used for regenerative braking in which the energy of the motor is used to charge batteries 654. The motor brake drivers 652 controllably communicate with microprocessor 618 via actuator outputs 624, to apply the brakes 648 to the wheels 640, 641 of the trailer 630. The communication may be through connector 658, or may alternatively be through any convenient connector, such as the connector mating with housing 660 for the electric brakes.

Each wheel may alternatively have, or may additionally be equipped with, an electric brake 656. The electric brake may be an electric drum brake or may be a caliper brake. A disconnect or switch 658 may be used to connect the electric drum brake 656 with the electric brake driver 662. An electric brake driver 662 may reside in housing 660, controllably communicating with microprocessor 618 via actuator outputs 624 to control the application of the electric brakes 656.

A sensor group 666 may also reside on the trailer 630, in sensory communication with the microprocessor 618 or the signal conditioner 620. The communication may be through a connector in housing 660 or via a wiring harness 668 between the sensor group 666 and the signal conditioner 620 or the microprocessor 618. The sensor group may contain at least one sensor that measures vehicle yaw rate, longitudinal acceleration, or lateral acceleration. Other sensors that may be useful on the trailer include a temperature sensor 668 on each brake or at least on each wheel 640, 641 of the trailer. A torque sensor 672 may be useful on each wheel 612 of the tow vehicle 610 and also on each wheel 640, 641 of the trailer 630. The torque sensor 672 measures the torque transmitted to the wheel and may be useful in evaluating slip or other driving factors involved in steering and braking. The tow vehicle may also be equipped with a steering wheel angle transducer 674 and a brake pedal sensor 676.

A user then employs a prime mover and a trailer simulator to develop a control scheme so that the brakes on the trailer are applied in such a manner as to avoid jackknifing, to control yaw torque, and to avoid flipping or overturning of the trailer. In one embodiment, the controller 618 uses an algorithm or program for braking force, by sensing information from the hitch force sensor 636, the articulation angle sensor 638, and the speed sensors 650 of trailer wheels 640, 641. The controller then applies the trailer brake 648 or 656, so that the speed of the trailer wheel sensors matches the speed of the vehicle speed sensor 614, with the force sensor 636 not exceeding a desired limit as deceleration occurs.

If braking occurs too rapidly, and an angle appears between the tow vehicle 610 and the trailer 630, yaw torque control may be needed. In this case, there is a yaw rate of the trailer $\dot\psi$, a desired yaw rate of the trailer, $\dot\psi_d$, an articulation angle $\eta$, and a desired articulation angle $\eta_d$, between the tow vehicle and the trailer. The desired yaw rate and the desired articulation angle are functions of the steering wheel angle and the longitudinal and lateral braking speeds. Braking torque differentiation is decided by an algorithm, in which If $(c_1|\dot\psi_d-\dot\psi|+c_2|\eta_d-\eta|)>Y_{yaw}$, Then $$T_{yaw} = [K_\psi - K_\eta]\begin{bmatrix}\Psi_d - \Psi \\ \eta_d - \eta\end{bmatrix},$$

where $Y_{yaw}$ is a predetermined or dynamically-determined threshold yaw value, $c_1$ and $c_2$ are coefficients, and K represents the gain of the appropriate controller. $T_{yaw}$ is the amount of torque required in each wheel to correct the yaw tendency.

The trailer simulator also helps prevent rollovers of trailers. One rollover protection algorithm that has been useful in preventing rollovers is If $|c_3\Phi+c_4\dot\Phi+c_5 a_y|>Y_{roll}$, Then $$T_{roll} = [K_\varphi\ \dot K_\varphi\ K_{ay}]\begin{bmatrix}\varphi \\ \dot\varphi \\ a_y\end{bmatrix}$$

where $c_3$, $c_4$ and $c_5$ are coefficients, $\Phi$ is the roll angle, $Y_{roll}$ is a predetermined or dynamically-determined threshold roll angle value, $\dot\Phi$ is the roll rate, and $a_y$ is the lateral acceleration. $T_{roll}$ is the amount of torque required in each wheel to correct the roll-over tendency. K represents the gain of the appropriate controller. The controller calculates this amount and sends commands to the corresponding actuators to prevent roll-over.

Figure 8:
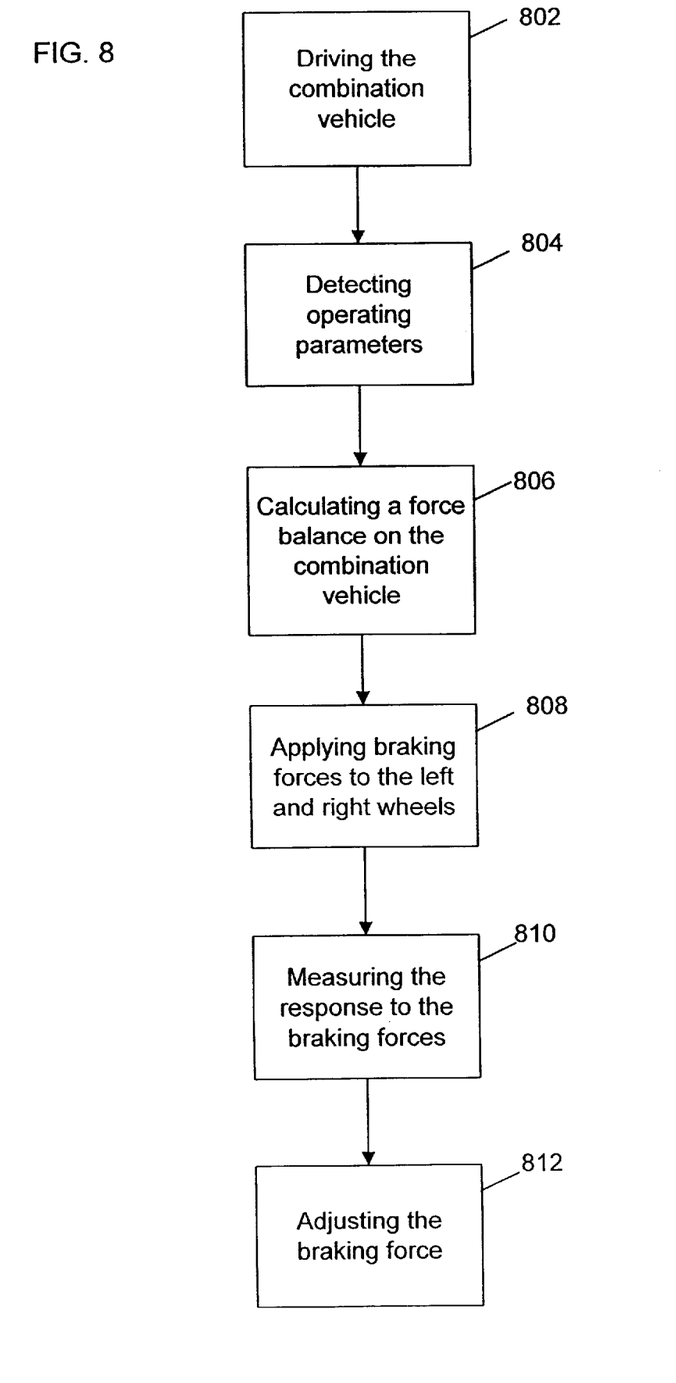
FIG. 8 is a flowchart for a method of operating a combination vehicle.

A mathematical model may be constructed for the equations of motion of the combination vehicle, such as a tractor-trailer. In an XYZ coordinate system, per FIG. 8, the tow vehicle or tractor's unsprung mass coordinate is $\{xu_1, yu_1, zu_1\}$, where the $zu_1$ axis passes through the center of gravity of the tractor or tow vehicle. The center of gravity of the tractor is $\{xs_1, ys_1, zs_1\}$. In determining roll rates, the controller considers motion of $\{xu_1, yu_1, zu_1\}$ relative to $\{xs_1, ys_1, zs_1\}$. The center of gravity of the trailer is $\{x_2, y_2, z_2\}$. In constructing a model, standard equations of motion may be used, including normal equations for kinetic and potential energies of the tractor and the trailer, and conventional coordinate transformation matrices. It has been found useful to develop of equations of motion from Lagrange's equation, $$\frac{d}{dt}\frac{\partial L}{\partial \dot q} - \frac{\partial L}{\partial q} = Q,$$

where L is the Langrangian operator, q is the generalized coordinate, $\dot q$ is the derivative of the generalized coordinate with respect to time, and Q is the generalized force.

Figure 7:
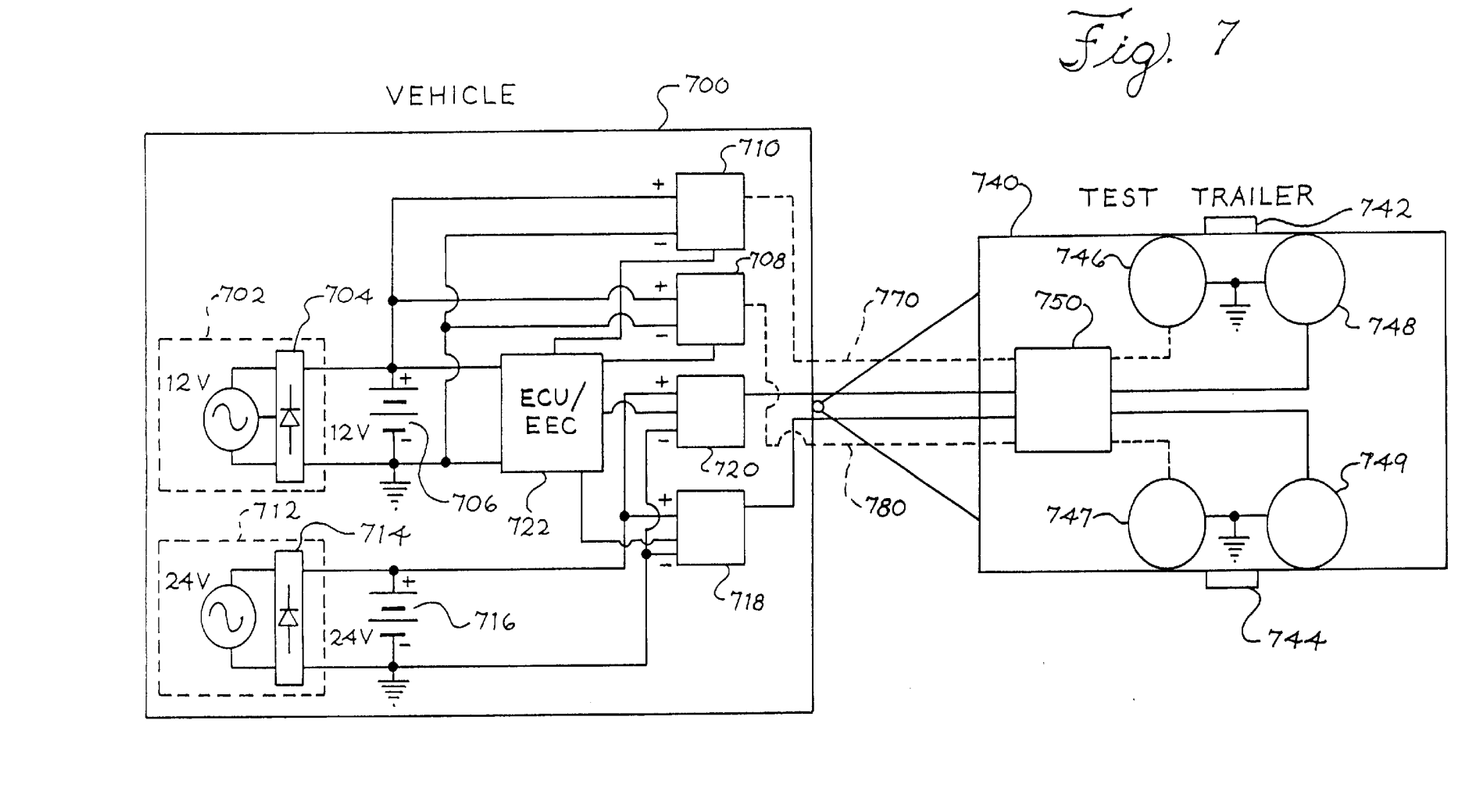
FIG. 7 is a top view of a tow vehicle and a trailer.

FIG. 7 depicts another embodiment, in which prime mover 700 tows trailer 740 via hitch or point of contact 770. Communication with and control of the trailer may be maintained via wiring harness 780. In this embodiment, the vehicle has a 12V battery 702 with power rectification 704 and a storage battery 706. The power controls electric brakes 746, 747 on wheels 742, 744 for trailer 740 through left side and right side controllers 708, 710. Alternatively, or in addition on a test vehicle, a vehicle alternator 712 may produce 24V of power, rectified by rectifier 714, and stored in storage battery 716. The higher power is more efficient for variable reluctance (VR) brakes. If VR brakes are used on the trailer, they may be controlled by left side and right side VR controllers 718, 720, with VR brakes 748, 749 on wheels 742, 744. Control lines and power lines may be routed through disconnect 750, such as a fail-safe disconnect. A fail-safe disconnect box is installed in the body of the trailer for emergencies. The VR and electric drum brake controllers are in communication with the vehicle electronic control unit (ECU) or vehicle controller 722. The vehicle controller is in sensory contact with sensors on the vehicle and on the trailer, as outlined for FIG. 6

There are many ways to practice the invention. The embodiments shown have incorporated a wide variety of sensors and equipment to enable users to vary vehicle and trailer performance over a wide range. The trailer may take the form of a semi-trailer as depicted in FIG. 4, or a tow dolly, as in FIG. 6, as well as the form of a cargo trailer, as in FIG. 7. All trailers of these or other types add to the instability of combination vehicles, and better control over the safety of all these vehicles is desired. Using the trailer simulator, the coefficients and parameters used in the above control algorithms can be calculated and refined. Coefficients and parameters may be calculated and applied to particular trailers and types of trailers, and the algorithms may be further refined according to other operating parameters capable of measurement by the sensors used in the trailer simulator. These parameters may include outside weather temperature as measured by a temperature sensor on the trailer simulator, pavement conditions deduced from slip measurements by wheel speed sensors, accelerometers, force sensors, torque sensors, or other sensors mounted on the vehicle or the trailer simulator. Parameters and coefficients developed by the trailer simulator and by the above methods may then be built into control systems for use in controlling trailers in combination vehicles.

FIG. 8 depicts another embodiment, a method of operating a combination vehicle having a trailer with independently controlled left and right wheel braking systems. A driver drives the combination vehicle 802. The combination vehicle may be a test vehicle for gathering data or measuring performance of the combination vehicle, or the combination vehicle may be for commercial or personal non-test use. The sensors and equipment on board the vehicle detect operating parameters 804, such as wheel speeds, yaw rate, and the like. During operation, the on-board computer may calculate continually any number of parameters of operation, including a force balance on the vehicle 806. Calculating the force balance gives the computer instantaneous or continually-updated data on the forward and lateral speed and acceleration of the tow vehicle and the trailer, as well as yaw angles, yaw rate, and so on. When the driver needs to apply the brakes, perhaps to slow down or to make a turn, the trailer braking systems allows the driver to apply the needed braking forces to the left and right wheels of the trailer 808, by applying the brake of the tow vehicle. The sensors and the computer then detect changes and measure the response of the tow vehicle and the trailer to the application of the brakes 810. The changes may include, but are not limited to, changes in individual wheel speeds, yaw angle, yaw rate, rollover forces, accelerations, forces and torques. The method then includes adjusting the braking force 812 to control the combination vehicle and to control braking forces, yaw angles and rates, yaw torque forces, and rollover forces.

Figure 9:
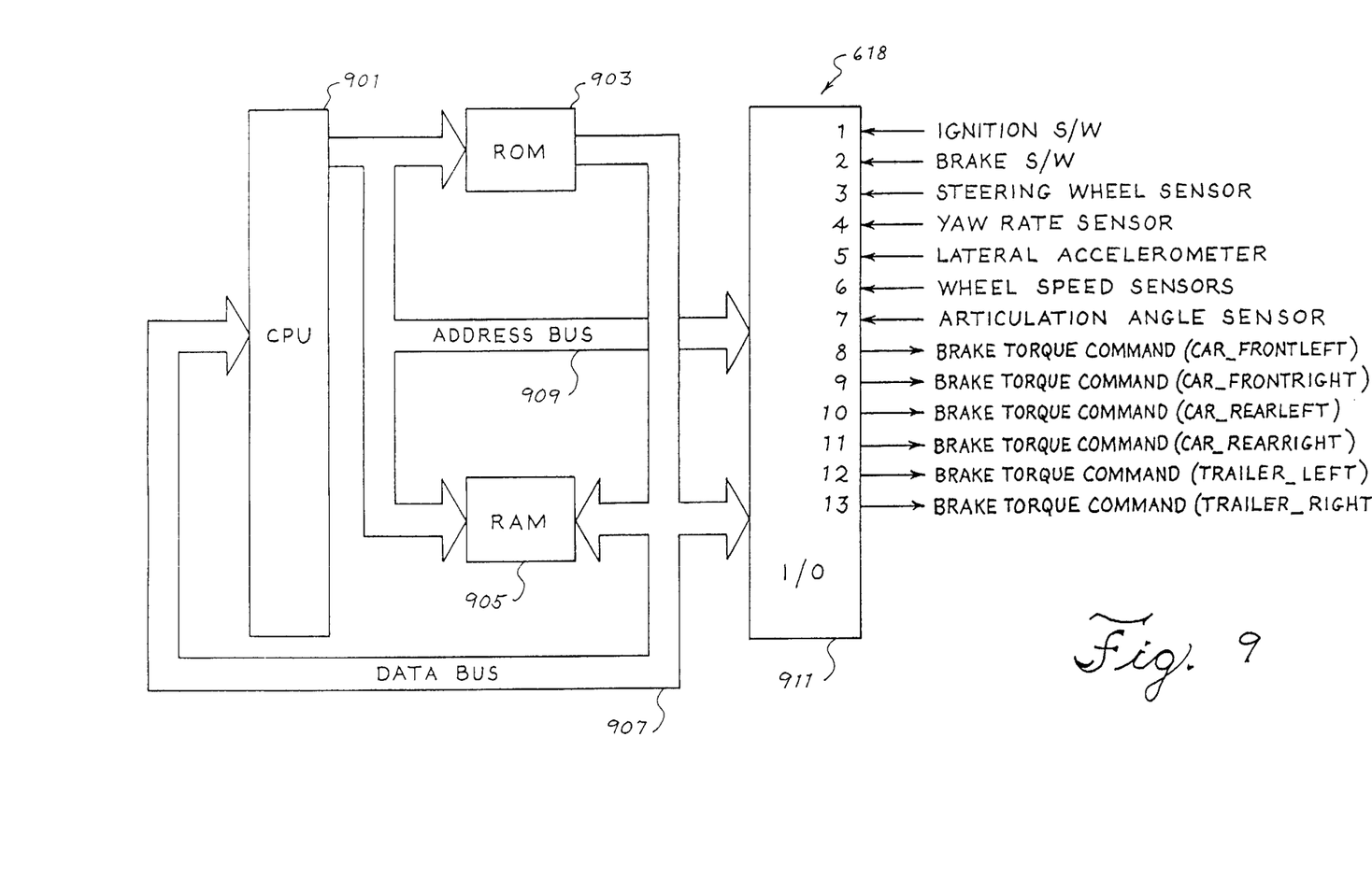
FIG. 9 is a block diagram of a microprocessor useful for controlling a combination vehicle.

FIG. 9 depicts a preferred embodiment of a microprocessor 618 useful for controlling a combination vehicle. The microprocessor preferably includes at least a central processing unit (CPU) 901, in communication with permanent, read-only memory (ROM) 903 and random-access memory (RAM) 905, useful for temporary storage. The microprocessor also desirably includes an input/output (I/O) module 911, through which the microprocessor receives sensory inputs and readings, and through which the microprocessor issues commands to the brakes and brake controllers on the trailer. As mentioned above, the microprocessor may have inputs including an ignition-on sensor or switch, and brake sensor or signals, a steering wheel sensor, one or more yaw rate sensors, one or more lateral accelerometers, at least two wheel speed sensors, and an articulation angle sensor. Outputs may include brake torque commands to each wheel of the prime mover or automobile, as well as at least two torque commands, to the left and right sides of the trailer. Some trailers may have a pair of wheels rather than single wheel on each side of the trailer. In these trailers, there should be a brake on each wheel, and the brakes should be applied to both wheels simultaneously with the same force and the same deceleration in wheel speed in both wheels. In other trailers, there may be two or four wheel pairs (see FIG. 4) on each side of the trailer. In these trailers, the brakes should be applied evenly to all wheels on one side of the trailer, so that all wheels on a side experience the same deceleration and the same reduction in wheel speed.

Figure 10:
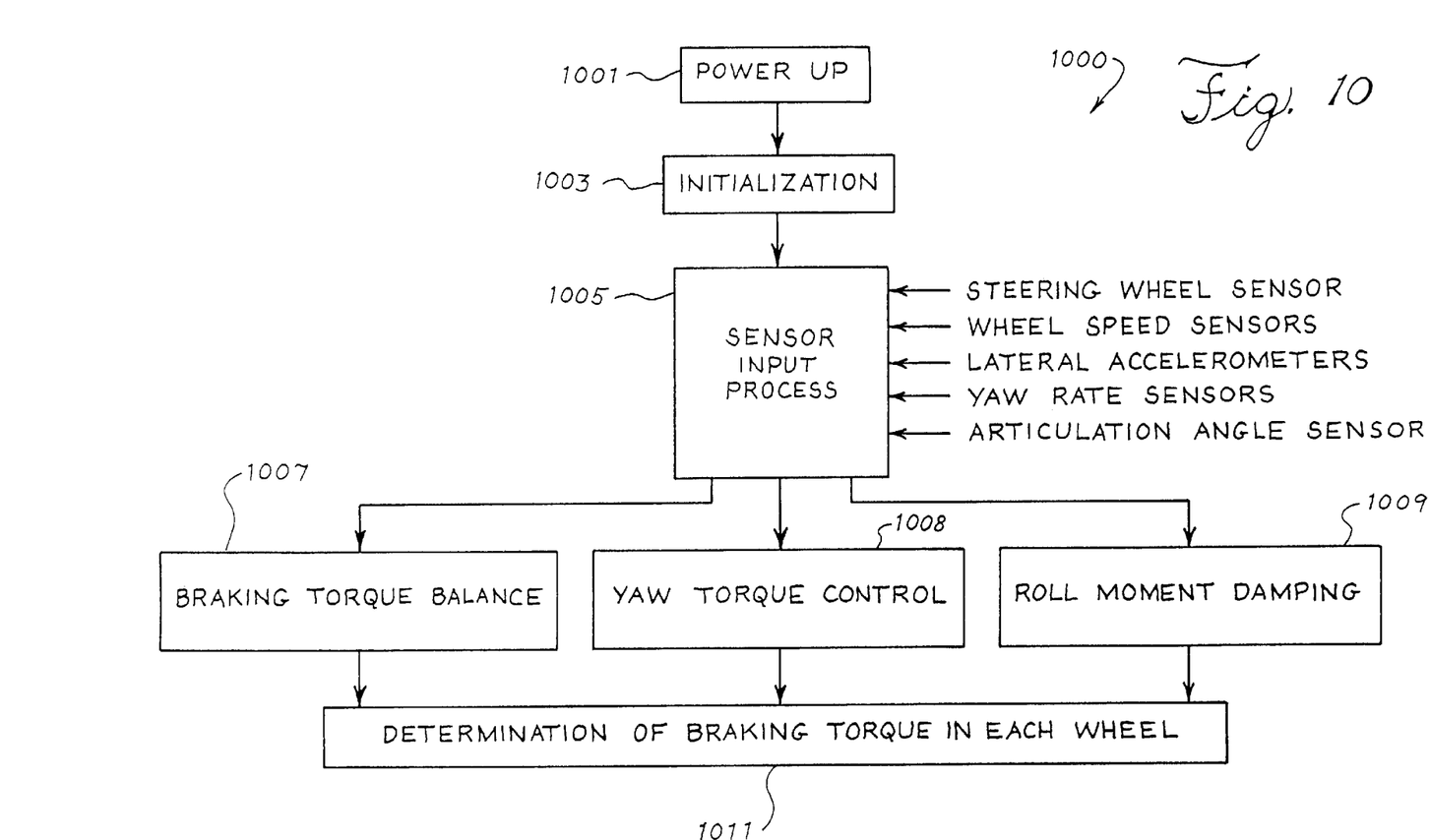
FIG. 10 is a flow chart for a method of controlling a combination vehicle.

FIG. 10 is a flow chart for a method 1000 of using a trailer control system. The control system powers up 1001 when an operator starts the vehicle. At that point, the microprocessor powers up 1003, as do all the sensors and other electrical and electronic parts of the trailer control system, including any initialization, location, or other preliminary checks. After power up, the first step in the method is to begin the sensor input process 1005, including location and verification (electronically) of the sensors, including, but not limited to, the steering wheel sensor 674, the brake pedal sensor 676, wheel speed sensors 650, lateral accelerometers or yaw rate sensors from sensor group 666, and articulation angle sensors 638. Other sensors used may also be included. Once sensory inputs begin and the vehicle begins to move, the microprocessor 618 continuously calculates methods to control braking torque 1007, yaw torque 1008, and roll moment 1009. The microprocessor checks to ensure that the variable values are within tolerance, and whether braking forces need to be applied 1001.

Figure 11:
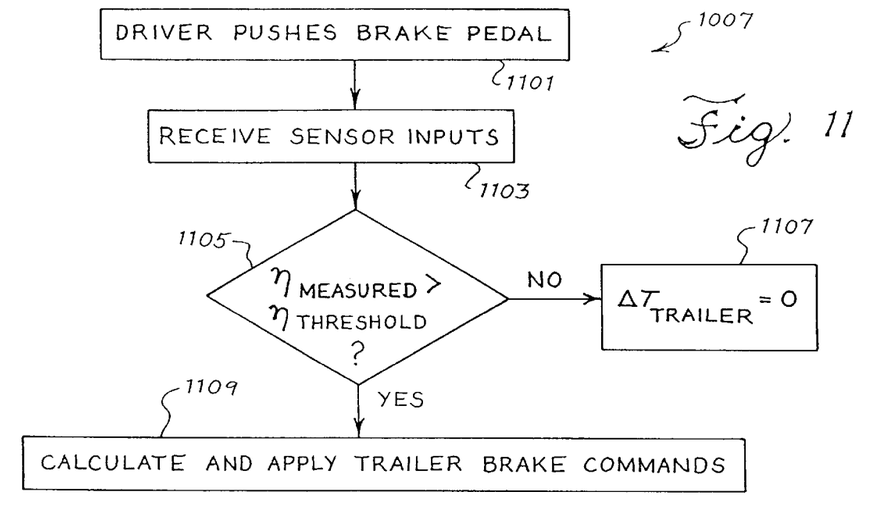
FIG. 11 is a flow chart for a method of controlling braking forces.

FIG. 11 is a flowchart for one exemplary method 1007 of using the microprocessor 618 as well as a method for calculating braking torque balance. In this example, the driver, operating the combination vehicle, applies the brakes 1101. The microprocessor 618 receives a number of sensory inputs related to the application of the brakes, preferably including a measured articulation angle, while a desired maximum or threshold articulation angle is available to the microprocessor 1103, for instance stored in ROM or programmed into the algorithm used to calculate braking torque balance. The microprocessor then compares the reported articulation angle with the desired maximum or threshold angle 1105. If the angle is within the desired limit, no correction to trailer left or right wheel braking is needed 1107. However, if the articulation angle exceeds the desired limit, then braking control torque for left and right side trailer wheels is needed, and the algorithm for calculating the needed forces is invoked and applied 1109.

In another example, an operating parameter, trailer wheel speed difference from average or trailer speed, exceeds the maximum desired difference, in a trailer having only a single left and a single right wheel. The trailer wheel sensor speeds are received at the microprocessor, and the microprocessor calculates a trailer speed by averaging the left and right wheel speeds. For each side, the microprocessor calculates a correction factor $\lambda$, where $\lambda_{left}$ or $\lambda_{right}=1-$(avg wheel speed)/(trailer speed). If there is a desired $\lambda$ or range for $\lambda$, then the microprocessor continually tracks and updates the parameter while applying a correction by issuing commands to the trailer left and right hand brake controllers or actuators. Then for $\lambda_{left}$ or $\lambda_{right}$, a torque is applied to the left or right wheel, or both, and a correction continually updated so long as the parameter is out of the desired limits.

For a correction on the trailer left wheel, $T_{tl}(k)=T_{tl}(k-1)+\Delta T_{tl}(-k)$, for a positive correction, or $T_{tl}(k)=T_{tl}(k-1)-\Delta T_{tl}(-k)$, for a negative correction, where T (k) is the torque applied to the appropriate wheel for time period k, and T(k−1) is the torque applied to the wheel in the previous time period. If there is no correction, then the torque applied during a present period does not change from the previous period, for example $T_{tl}(k)=T_{tl}(k-1)+0$ for a left wheel, or $T_{tr}(k)=T_{tr}(k-1)+0$ for a right wheel.

Figure 12:
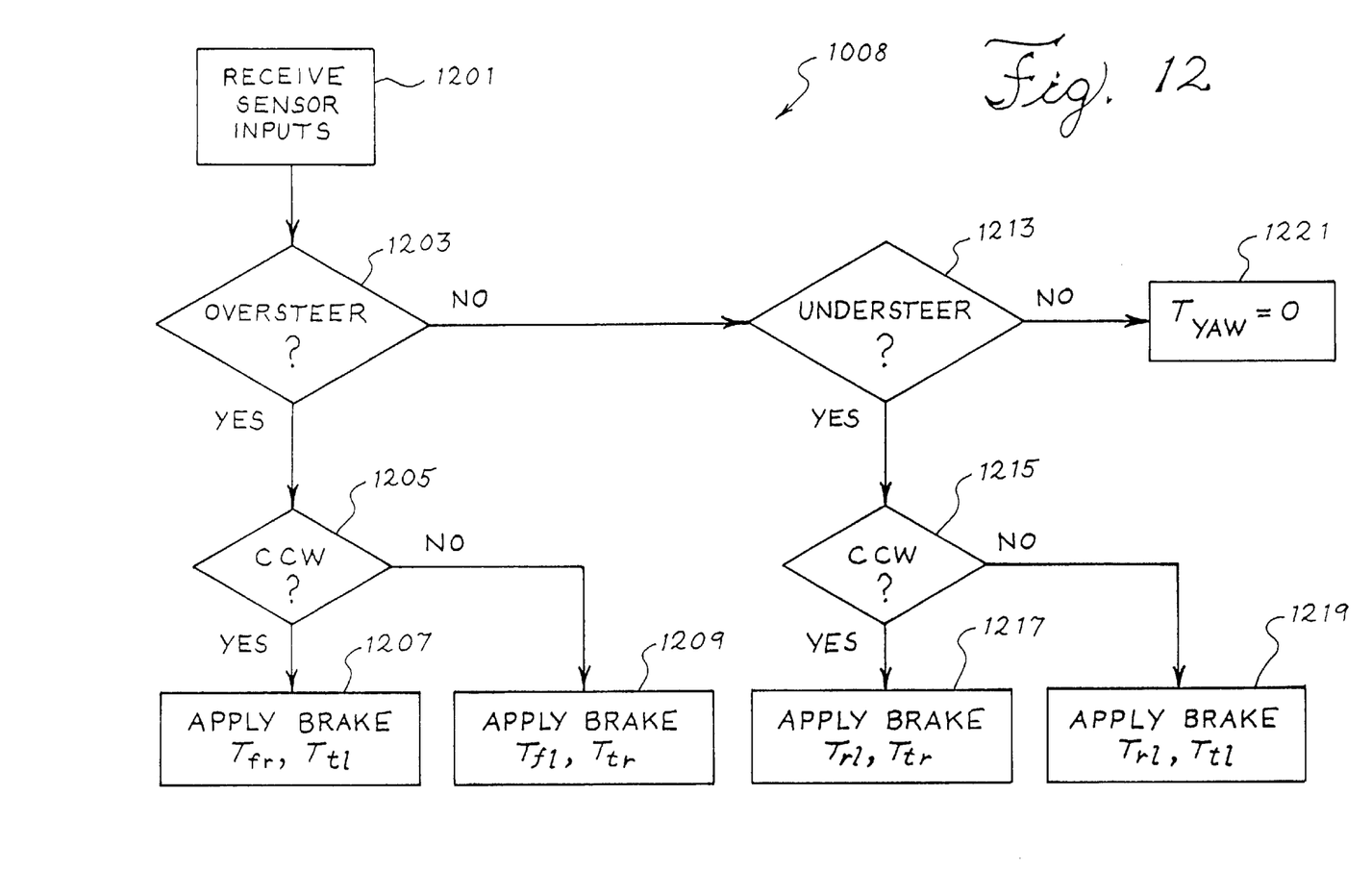
FIG. 12 is a flow chart for a method of controlling yaw torque.

FIG. 12 is a flow chart for a method 1108 of applying torque to prime mover and trailer wheels to control yaw, oversteering or understeering, of the combination vehicle. The microprocessor receives sensory inputs continuously 1201 and calculates whether there is an oversteer 1203, an understeer 1213 or no deviation 1221 in need of correction. If there is an oversteer, the microprocessor determines whether the oversteer is in a counter-clock wise (CCW) (left) direction or not (right, clockwise) and then applies the appropriate brakes. In the case of CCW oversteer, the microprocessor will issue commands 1207 to apply brakes to the prime mover right front wheel and the trailer left side wheel. In the case of a CW oversteer, the microprocessor will issue commands 1209 to apply brakes to the prime mover left front wheel and the trailer right side wheel.

On the other hand, if there is an understeer, the microprocessor will determine whether the understeer is an a CCW direction or not 1215, and will then apply the appropriate brakes. If there is a CCW understeer, the microprocessor will issue commands 1217 to apply brakes to the prime mover left rear wheel and the trailer right side. If there is a CW understeer, the microprocessor will issue commands 1219 to apply brakes to the prime mover left rear wheel and the trailer left side wheel (s).

Figure 13:
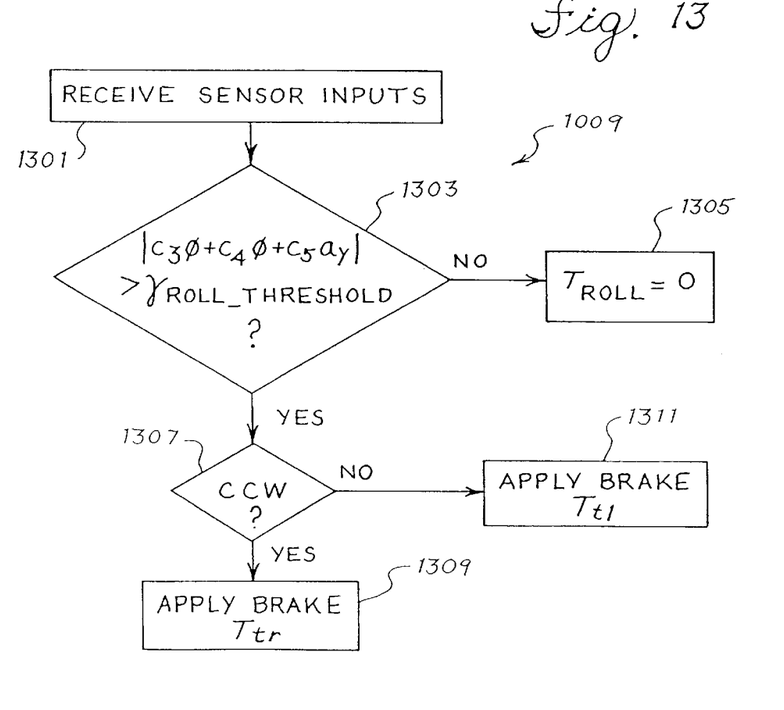
FIG. 13 is a flow chart for a method of damping roll moment.

FIG. 13 is a flow chart for a method of controlling or damping roll moment 1009. In this method, the microprocessor continually receives sensory inputs 1301 from the sensors on the vehicle. The microprocessor takes those inputs, and in particular the inputs related to the roll angle, the roll rate, and lateral acceleration, and calculates a value for a roll angle or tendency. It also compares this roll angle to a predetermined threshold value for a roll angle 1303. If the tendency or angle is less than the threshold, there is no need for corrective action 1305. However, if the angle is greater than the threshold value, the microprocessor then calculates the direction of the roll 1307, and applies brakes on the trailer right side for CCW roll 1309 or applies brakes on the trailer left side for CW roll 1311.

As described above, there are many ways to practice the invention. It is intended that the foregoing description illustrates rather than limits this invention, and that it is the following claims, including all equivalents, which define this invention. Of course, it should be understood that a wide range of changes and modifications may be made to the embodiments described above. Accordingly, it is the intention of the applicants to protect all variations and modifications within the valid scope of the present invention. It is intended that the invention be defined by the following claims, including all equivalents.

What is claimed is:

1. A control system for a combination vehicle having a prime mover and a trailer, the control system comprising:
   a computer;
   a memory accessible to said computer;
   an algorithm for calculating braking forces to correct forces selected from the group consisting of braking forces, yaw forces, and rollover forces stored in the memory;
   sensors operably connected to said computer;
   output signals from said computer; and
   at least two brake controllers for wheels on the trailer, said brake controllers in communication with said computer, wherein the computer receives inputs from sensors on the combination vehicle and calculates brake movements to control movement of the combination vehicle, and wherein the algorithm for calculating braking forces calculates a required braking force for each wheel on the prime mover and trailer to overcome yaw forces, and said algorithm is If $(c_1|\dot\psi_d-\dot\psi|+c_2|\eta_d-\eta|)>Y_{yaw}$, Then $$T_{yaw} = [K_\psi - K_\eta]\begin{bmatrix} \dot\psi_d - \dot\psi \\ \eta_d - \eta \end{bmatrix},$$

where $c_1$ and $c_2$ are coefficients, $\dot\psi_d$ is a desired yaw rate, $\dot\psi$ is a yaw rate, $\eta_d$ is a desired articulation angle, $\eta$ is an articulation angle, $Y_{yaw}$ is a predetermined or dynamically-calculated threshold value, $T_{yaw}$ is a torque applied to a wheel to overcome a yaw rate, and K is a gain.

2. The control system of claim 1, wherein the sensors are selected from the group consisting of a temperature sensor, a yaw rate sensor, an accelerometer, a force sensor, a string potentiometer, a speedometer, a wheel speed sensor, a torque sensor, and a steering-wheel angle sensor.

3. The control system of claim 1, further comprising at least one brake on each wheel of the prime mover and the trailer, said brake selected from the group consisting of a hydraulic brake, an electric drum brake, and a variable reluctance brake.

4. The control system of claim 1, further comprising an electronic control module between the computer and the sensors, wherein the electronic control module receives signals from the sensors and conditions said signals for input to the computer.

5. The control system of claim 4, further comprising a digital signal processor connected between the electronic control module and the computer, wherein the digital signal processor receives outputs from the electronic control module, processes the outputs, and sends the outputs to the computer.

6. A control system for a combination vehicle having a prime mover and a trailer, the control system comprising:
   a computer;
   a memory accessible to said computer;
   an algorithm for calculating braking forces to correct forces selected from the group consisting of braking forces, yaw forces, and rollover forces stored in the memory;
   sensors operably connected to said computer;
   output signals from said computer; and
   at least two brake controllers for wheels on the trailer, said brake controllers in communication with said computer, wherein the computer receives inputs from sensors on the combination vehicle and calculates brake movements to control movement of the combination vehicle, and wherein the algorithm for calculating braking forces calculates a required torque force for each wheel on the trailer to overcome rollover forces, and said algorithm is If $|c_3\Phi+c_4\dot\Phi+c_5 a_y|>Y_{roll}$, Then $$T_{roll} = \begin{bmatrix} K_\varphi & \dot K_\varphi & K_{ay} \end{bmatrix}\begin{bmatrix} \varphi \\ \dot\varphi \\ a_{y.} \end{bmatrix}$$

where $c_3$, $c_4$ and $c_5$ are coefficients, $\Phi$ is a roll angle, $\dot\Phi$ is a roll rate, $a_y$ is a lateral acceleration, $Y_{roll}$ is a predetermined or dynamically-determined threshold value, $T_{roll}$ is an amount of torque required in each wheel to correct a roll-over, and K is a gain.

7. The control system of claim 6, wherein the sensors are selected from the group consisting of a temperature sensor, a yaw rate sensor, an accelerometer, a force sensor, a string potentiometer, a speedometer, a wheel speed sensor, a torque sensor, and a steering-wheel angle sensor.

8. The control system of claim 6, further comprising at least one brake on each wheel of the prime mover and the trailer, said brake selected from the group consisting of a hydraulic brake, an electric drum brake, and a variable reluctance brake.

9. The control system of claim 6, further comprising an electronic control module between the computer and the sensors, wherein the electronic control module receives signals from the sensors and conditions said signals for input to the computer.

10. The control system of claim 6, further comprising a digital signal processor connected between the electronic control module and the computer, wherein the digital signal processor receives outputs from the electronic control module, processes the outputs, and sends the outputs to the computer.

11. A method of controlling braking of a combination vehicle, the method comprising:
measuring a plurality of parameters relating to movements and speed of a prime mover and a trailer;
calculating at least one steering error selected from the group consisting of a braking error, a yaw steering error, and a trailer roll;
calculating a correction to a speed of at least one wheel on the trailer to correct the steering error; and
applying said correction by applying a braking force to the at least one wheel, wherein if yaw forces are present the method uses an algorithm for calculating a required braking force for each wheel on the prime mover and trailer to overcome the yaw forces, and the algorithm is If $(c_1|\dot{\psi}_d-\dot{\psi}|+c_2|\eta_d-\eta|)>Y_{yaw}$, Then $$T_{yaw} = [K_\psi - K_\eta]\begin{bmatrix} \dot{\psi}_d - \dot{\psi} \\ \eta_d - \eta \end{bmatrix},$$

where $c_1$ and $c_2$ are coefficients, $\dot{\psi}_d$ is a desired yaw rate, $\dot{\psi}$ is a yaw rate, $\eta_d$ is a desired articulation angle, $\eta$ is an articulation angle, $Y_{yaw}$ is a predetermined or dynamically-calculated threshold value, $T_{yaw}$ is a torque applied to a wheel to overcome a yaw rate, and K is a gain.

12. The method of claim 11, wherein the parameters are selected from the group consisting of a prime mover speed, a prime mover steering wheel angle, a trailer speed, a yaw rate, an acceleration, an articulation angle, a wheel speed, a wheel temperature, a wheel torque, a brake temperature, a brake pedal force, and a trailer hitch force.

13. The method of claim 11, wherein the steering error is a braking error, and further comprising measuring an articulation angle, comparing the articulation angle to a desired threshold articulation angle, and applying a correction to the trailer wheels to equalize a speed of a left and a right trailer wheel.

14. The method of claim 11, wherein the steering error is a vehicle yaw error, and further comprising calculating whether the yaw steering error is an oversteer or an understeer, calculating a direction of the error, and applying a correction to at least one wheel of the prime mover and one wheel of the trailer.

15. The method of claim 11, wherein the steering error is a trailer roll, and further comprising calculating whether the trailer roll is greater than a threshold value, calculating a direction of the roll, and applying a braking force to a wheel of the trailer to correct the roll if the trailer roll is greater than the threshold value.

16. A method of
controlling braking of a combination vehicle, the method comprising:
measuring a plurality of parameters relating to movements and speed of a prime mover and a trailer;
calculating at least one steering error selected from the group consisting of a braking error, a yaw steering error, and a trailer roll;
calculating a correction to a speed of at least one wheel on the trailer to correct the steering error; and
applying said correction by applying a braking force to the at least one wheel, wherein if rollover forces are present the method uses an algorithm for calculating braking forces and wherein the algorithm for calculating braking forces calculates a required torque force for each wheel on the trailer to overcome rollover forces, and the algorithm is If $|c_3\Phi+c_4\dot{\Phi}+c_5 a_y|>Y_{roll}$, Then $$T_{roll} = [K_\varphi \; \dot{K}_\varphi \; K_{ay}]\begin{bmatrix} \varphi \\ \dot{\varphi} \\ a_{y.} \end{bmatrix}$$

where $c_3$, $c_4$ and $c_5$ are coefficients, $\Phi$ is a roll angle, $\dot{\Phi}$ is a roll rate, $a_y$ is a lateral acceleration, $Y_{roll}$ is a predetermined or dynamically-determined threshold value, $T_{roll}$ is an amount of torque required in each wheel to correct a roll-over, and K is a gain.

17. The method of claim 16, wherein the operating parameters are selected from the group consisting of a prime mover speed, a prime mover steering wheel angle, a trailer speed, a yaw rate, an acceleration, an articulation angle, a wheel speed, a wheel temperature, a wheel torque, a brake temperature, a brake pedal force, and a trailer hitch force.

18. The method of claim 16, further comprising:
measuring a response of the operating parameters to the braking force; and
adjusting the braking force to avoid understeering, oversteering, jackknifing, or rolling the trailer.

* * * * *